United States Patent [19]

Bernitsas

[11] Patent Number: 5,570,321
[45] Date of Patent: Oct. 29, 1996

[54] SEISMIC VELOCITY MODEL OPTIMIZATION METHOD USING SIMULATED ANNEARLING TO DETERMINE PRESTACK TRAVEL-TIMES

[75] Inventor: Nikolaos Bernitsas, Dallas, Tex.

[73] Assignee: Atlantic Richfield Company, Los Angeles, Calif.

[21] Appl. No.: 542,069

[22] Filed: Oct. 12, 1995

Related U.S. Application Data

[63] Continuation of Ser. No. 205,912, Mar. 3, 1994, abandoned.
[51] Int. Cl.$^6$ ........................................ G01V 1/36
[52] U.S. Cl. ............................ 367/38; 367/50; 367/73; 364/421
[58] Field of Search ........................ 367/38, 50, 73; 364/421

[56] References Cited

U.S. PATENT DOCUMENTS

| 4,813,027 | 3/1989 | Tieman | 367/52 |
|---|---|---|---|
| 4,817,060 | 3/1989 | Smith . | |
| 4,982,382 | 1/1991 | Dablain . | |
| 4,992,996 | 2/1991 | Wang et al. | 367/53 |
| 5,089,994 | 2/1992 | Harlan et al. | 367/73 |
| 5,193,077 | 3/1993 | Weiglein et al. . | |
| 5,197,039 | 3/1993 | Corcoran et al. | 367/52 |
| 5,258,960 | 11/1993 | Swan . | |
| 5,297,108 | 3/1994 | Swan . | |
| 5,416,750 | 5/1995 | Doyen et al. | 367/73 |
| 5,450,371 | 9/1995 | MacKay | 367/63 |

FOREIGN PATENT DOCUMENTS

| 9410586 | 5/1994 | WIPO | 367/73 |
|---|---|---|---|

OTHER PUBLICATIONS

Evgency Landa, Wafik Beydoun and Albert Tarantolo, *Reference Velocity Model Estimation From Prestack Waveforms: Coherency Optimization By Simulated Annealing*, Aug. 1989, pp. 984–990.

May et al., "Higher–Order Moveout Spectra", *Geophysics*, vol. 44, (Jul. 1979), pp. 1193–1207.

Cao et al, "A Simultaneous Inversion for Background Velocity and Impedance Maps", *Geophysics*, vol. 55, No. 4, pp. 458–469.

Simmons et al, "Linearized Tomographic Inversion of First–Arrival Times", *Geophysics*, vol. 57, No. 11, pp. 1482–1492.

Crase et al, "Robust Elastic Nonlinear Waveform Inversion: Application to Real Data", *Geophysics*, vol. 55, No. 5, pp. 527–538.

*Primary Examiner*—Michael J. Carone
*Assistant Examiner*—Christopher K. Montgomery
*Attorney, Agent, or Firm*—David L. McCombs

[57] ABSTRACT

A method of determining a reference seismic velocity model that includes lateral and vertical variations in a stratified subterranean medium is disclosed. The invention recognizes that each unknown prestack traveltime curve may be expressed as the sum of a best fit hyperbola and a non-hyperbolic perturbation term. After the best fit hyperbola has been determined and used to correct the traces for normal moveout (NMO), the non-hyperbolic perturbation term is solved for using a simulated annealing technique. In addition, the problem of topologically representing a subsurface having complicated horizon geometries is bypassed by assuming a smooth and continuous, rather than a layered and discontinuous, velocity model. This assumption facilitates raytracing and in most cases, results in a model that more accurately represents the velocity function. Error minimization during model updates is achieved by solving a linear system of equations subject to a set of constraint equations.

13 Claims, 12 Drawing Sheets

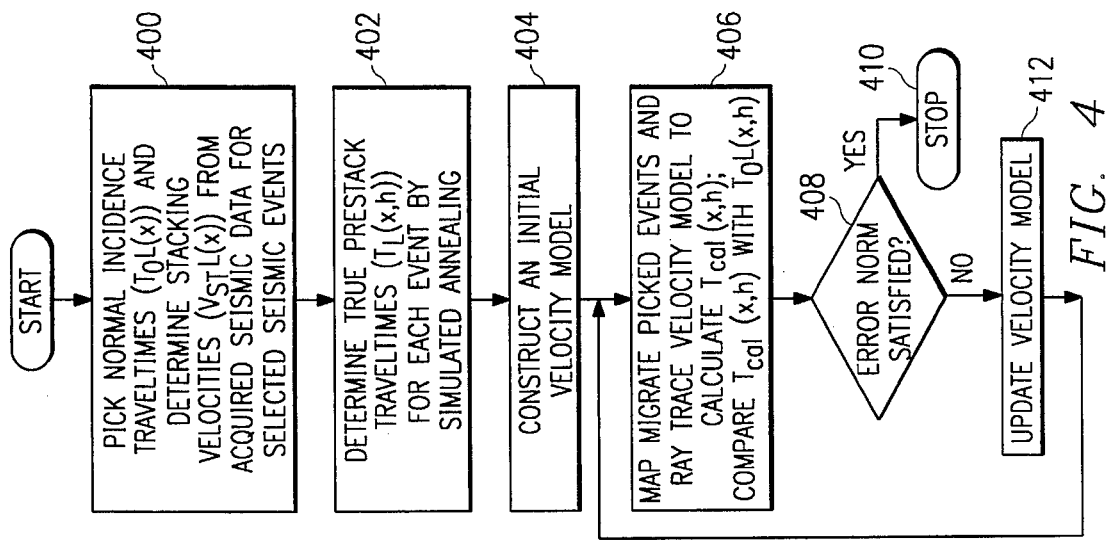
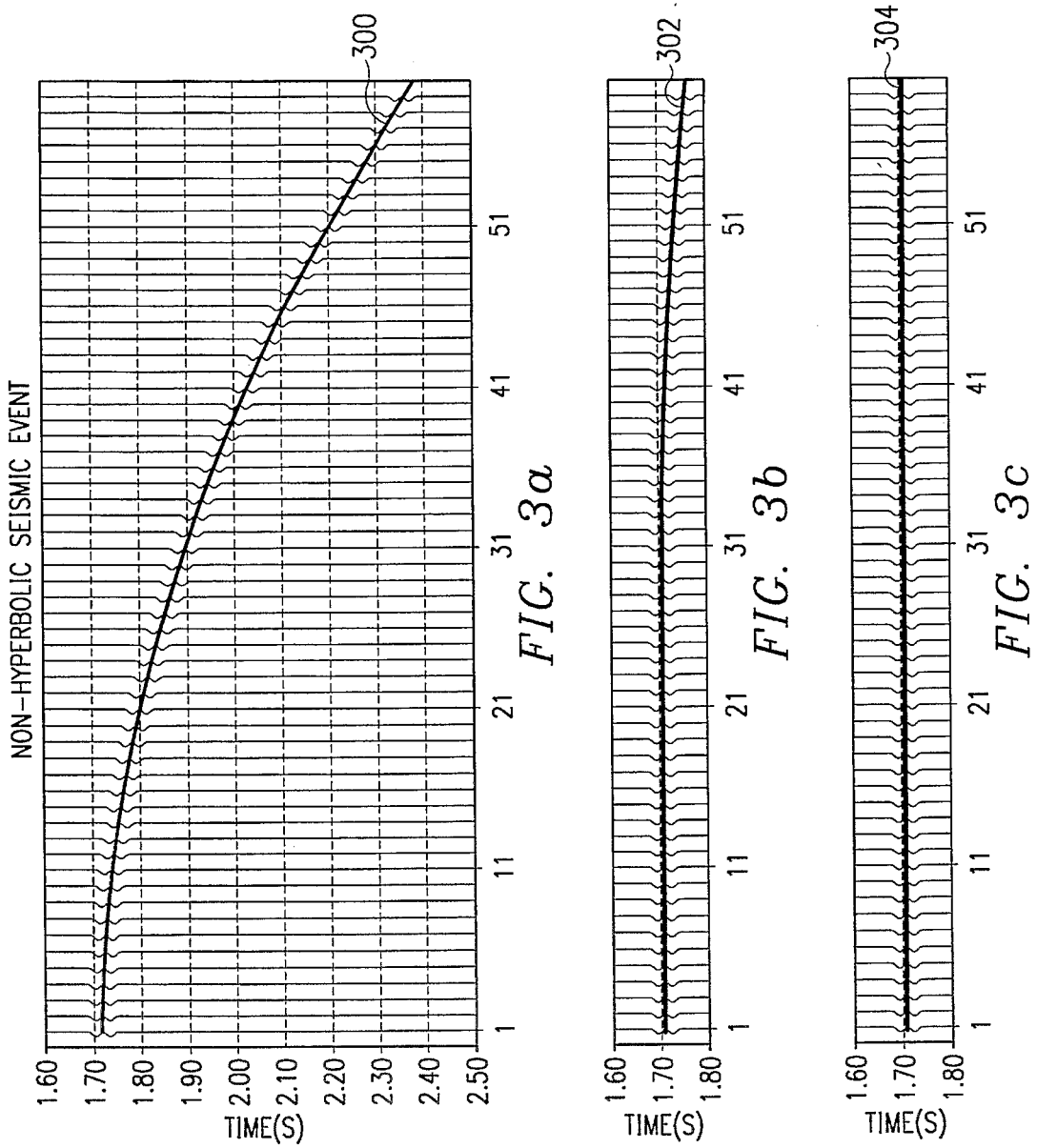

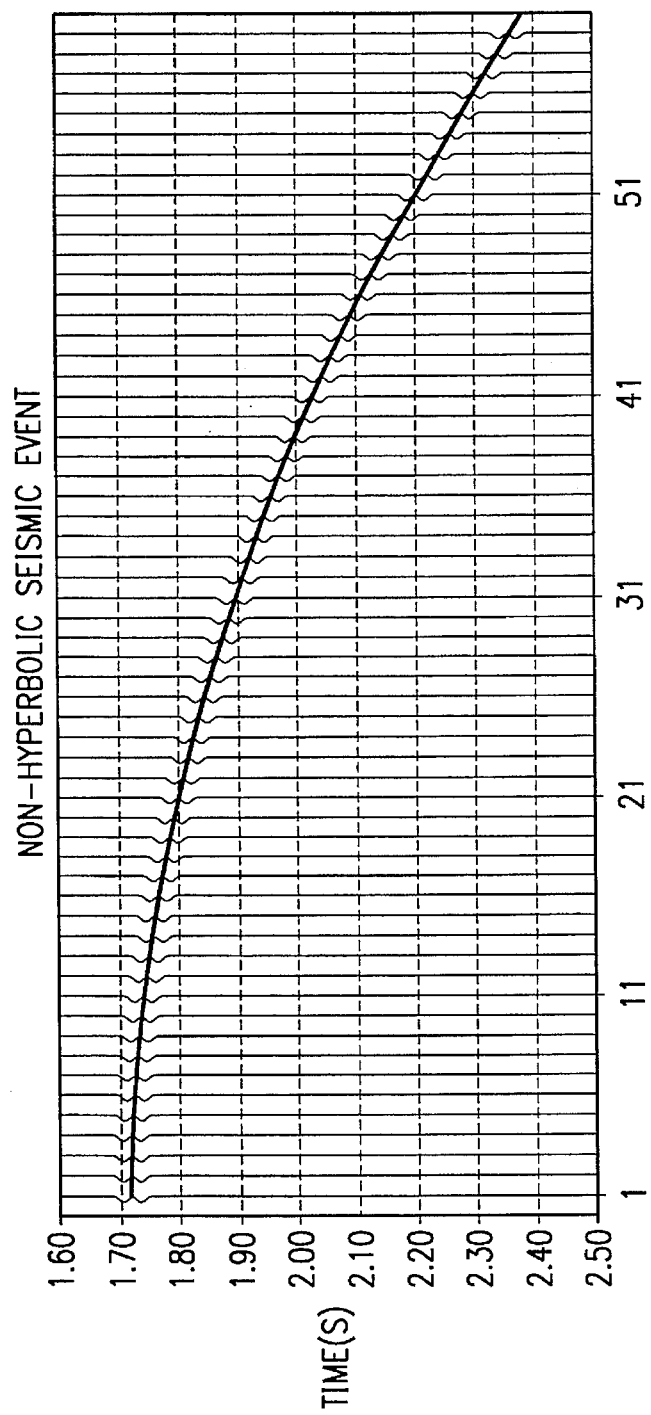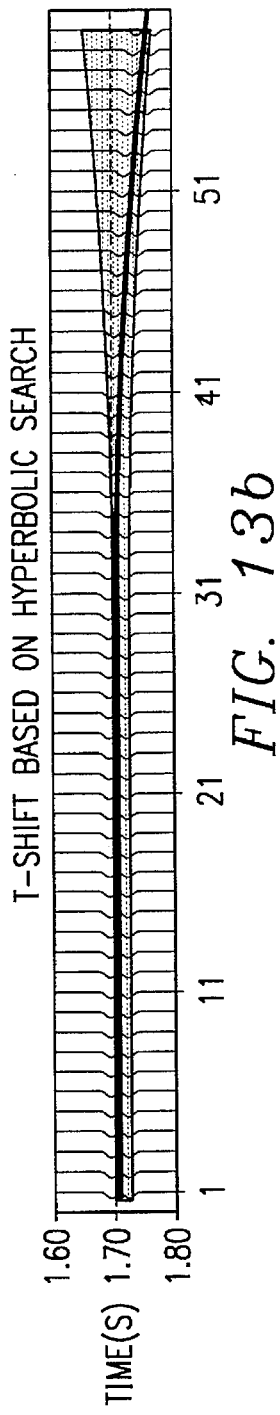

SEISMIC VELOCITY MODEL OPTIMIZATION METHOD USING SIMULATED ANNEARLING TO DETERMINE PRESTACK TRAVEL-TIMES

This is a continuation of application Ser. No. 08/205,912 filed on Mar. 3, 1994, now abandoned.

FIELD OF THE INVENTION

This invention relates to an improved method of estimating seismic velocities for use in processing and interpreting seismic data indicating valuable characteristics of subsurface earth formations, and particularly, to a method in which prestack traveltimes are determined by a simulated annealing technique and used to recover a geologically constrained, continuous (or smooth) subsurface velocity model.

BACKGROUND OF THE INVENTION

Conventional seismic data acquisition techniques involve the use of an appropriate signal source to generate seismic energy and a set of corresponding receivers, such as geophones, spaced along or near the surface, to detect any reflected seismic signals due to seismic energy striking subsurface geological boundaries. The seismic signals are generated sequentially at each of a number of points along a seismic prospecting path while reflections are recorded at all of the points following generation of each signal. The recorded signals are then organized into gathers of traces each corresponding to a common depth point or common midpoint along the prospect path. The basic purpose of this exploration technique is to allow the signals within each gather to be combined to improve the signal to noise ratio. Due to the different path lengths involved in each source and receiver pair, corrections must be made to the individual traces within the gather to place them in alignment before stacking. These corrections are performed by a processing technique referred to as hyperbolic normal moveout (NMO), the accuracy of which depends primarily on estimated velocities of the signals passing through the earth formations.

Accurate determination of the velocity distribution of the subsurface is necessary for obtaining accurate images of subsurface formations because errors in velocity estimation result in errors in the alignment of these signals and thereby reduce the signal-to-noise ratio of the resulting stacked signal. Traditional seismic processing techniques, such as ray map migration, and new developments, such as amplitude versus offset (AVO) and multiparameter inversion techniques, are critically dependent upon the low-frequency velocity field. Prestack reflection traveltimes of seismic signals are required input for any algorithm attempting to map accurately the velocity distribution of the subsurface. The nonhyperbolic nature of prestack traveltime curves even in the presence of flat bedding-plane geometry has long been recognized, and further, large model-dependent oscillations can be observed, especially at large offset-to-depth ratios. Compounding the problem, lateral velocity variations and data acquisition complications, such as streamer feathering, can introduce traveltime perturbations of arbitrary, non-hyperbolic shape. Although these problems are well known, for reasons of efficiency and signal-to-noise ratio considerations, stacking velocity analyses typically are still carried out as a two-parameter hyperbolic search.

A recently developed strategy for determining velocity variations in a stratified earth, commonly referred to as tomography, has been used to produce enhanced subsurface images. Traveltime tomography techniques involve three steps: identifying a number of key horizons in a stacked section; determining the corresponding prestacked traveltimes; and solving for a velocity-depth model that reproduces the observed traveltimes.

However, tomography is not routinely practiced because of its requirement for accurate prestack reflection traveltime selection. Three different schemes are usually employed for selecting, or "picking," traveltimes, each of which has certain disadvantages. One approach is to digitize prestacked traveltime data on an interactive work station. However, this is a very tedious process requiring the display and selection of thousands of seismic events. A second approach is to use stacking velocities and zero-offset times to construct a subsurface macro model. However, this technique is based essentially on a hyperbolic approximation to arrival times, and is therefore inaccurate. A third approach is to overcome the need for accurate traveltime picking by employing a coherency inversion method which does not depend on prestack time picking and is not based on curve fitting or hyperbolic approximations. The method is formulated as one of global optimization of some energy function. An optimization algorithm produces a velocity model which maximizes some measure of coherency. This measure is calculated on unstacked trace gathers in a time window along the traveltime curves which are determined by tracing rays through the model. Knowledge of zero-offset traveltimes for principal reflectors (for example, from post-stack picking) is used alternatively to update velocities using the coherency measure and the interface position using zero offset time information until an optimal solution is obtained. Since velocity updating using the coherency measure is a highly nonlinear process, it is performed using a type of Monte Carlo technique referred to as the generalized simulated annealing method for updating the velocity field. Coherency optimization by simulated annealing is described in detail in E. Landa et al., "Reference Velocity Model Estimation from Prestack Waveforms: Coherency Optimization by Simulated Annealing," 54 *Geophysics* 984–990 (1989). However, a major disadvantage of the foregoing coherency optimization method is that it requires large computational resources to perform computations for a large number of model parameters, with the ever present risk of inaccuracy due to cycle skipping and convergence to local minima.

What is needed is a tomographic technique for analyzing seismic data in which prestack traveltimes are determined by a method other than manual picking, since prestack traveltimes are a required input for any algorithm attempting to map accurately the velocity distribution of a subsurface. Such a technique would enable reference velocity model estimation based upon a traveltime-based solution as a preferred alternative to coherency optimization for the reasons described above.

SUMMARY OF THE INVENTION

The foregoing problems are solved and a technical advance is achieved by a method of the present invention for optimization of a seismic velocity model. According to the method of the present invention, each unknown prestack traveltime curve may be expressed as the sum of a best fit hyperbola and a non-hyperbolic perturbation term. In a departure from the art, after the best fit hyperbola has been determined and used to correct the traces for normal moveout (NMO), the non-hyperbolic perturbation term is solved for using a simulated annealing technique. In a further departure from the art, the problem of topologically representing a subsurface having complicated horizon geometries is bypassed by assuming a smooth and continuous, rather than a layered and discontinuous, velocity model. This assumption facilitates raytracing and in most cases, results in a model that more accurately represents the velocity function. Error minimization during model updates is achieved by solving a linear system of equations subject to a set of constraint equations.

In a preferred implementation, seismic events are selected and normal incidence traveltimes $T_{0L}(x)$ and stacking velocities $V_{stL}(x)$ are determined from acquired seismic data for the selected seismic events. For each selected event, correction for NMO is performed using a best-fit hyperbola. The residual NMO is determined using a simulated annealing technique, which is an optimization method in which a multi-parameter model space is sampled randomly at different points. Simulated annealing is performed independently on every seismic event and every CDP gather.

The true prestack traveltimes $T_L(x, h)$ for each event are defined as the sum of the best-fit hyperbola and a perturbation term determined by simulated annealing. An initial velocity model is constructed on the assumption that the subsurface horizon being modeled is smooth and continuous. Ray map migration is performed to convert the $T_{0L}(x)$ normal incidence traveltime to depth. Subsequently, ray tracing is used to calculate model traveltimes Tcal(x, h). The model traveltimes are compared with the true prestack traveltimes and if the two are sufficiently close, the method is complete, because the model is sufficiently accurate. Otherwise, the velocity model is updated according to a set of linear equations subject to a set of constraints so that the smooth velocity model mimics the observed layers on the seismic section. As a result, the method of the present invention takes into account the idea that prestack traveltime determination is a local, ensemble-based energy optimization problem that can be efficiently solved using a modified simulated annealing technique.

A technical advantage achieved with the present invention is that it can be automated, resulting in highly accurate model with a limited amount of manual effort.

Another technical advantage achieved with the present invention is that, because the velocity is not solved for one layer at a time (layer stripping), but globally, deeper data is allowed to constrain the solution at shallower parts of the model, so that propagation and magnification of error commonly associated with layer stripping is bypassed.

A further technical advantage achieved with the invention is that it is capable of constraining the solution in areas of the model where ray coverage is poor by using information based on the geometry of the reflectors themselves recovered from the seismic section.

A further technical advantage achieved with the invention is that it significantly decreases the amount of time necessary to develop an accurate model.

BRIEF DESCRIPTION OF THE DRAWINGS

FIG. 3a illustrates a synthetic common depth point (CDP) record of a single seismic event.

FIG. 3b illustrates the seismic event of FIG. 3a after correction for normal moveout (NMO) using prior art techniques.

FIG. 3c illustrates the seismic event of FIG. 3a after correction for residual NMO using a simulated annealing technique of the present invention.

FIG. 4 is a flow chart illustrating a method of the present invention for optimizing a reference seismic velocity model used to determine velocity variations in a stratified subterranean structure.

FIGS. 13a and 13b illustrate time-shifting of a non-hyperbolic seismic event based on a best fit hyperbolic moveout. FIG. 13b also shows the window over which the search for the nonhyperbolic component of the event is carried out.

DESCRIPTION OF THE PREFERRED EMBODIMENTS

Figure 1:
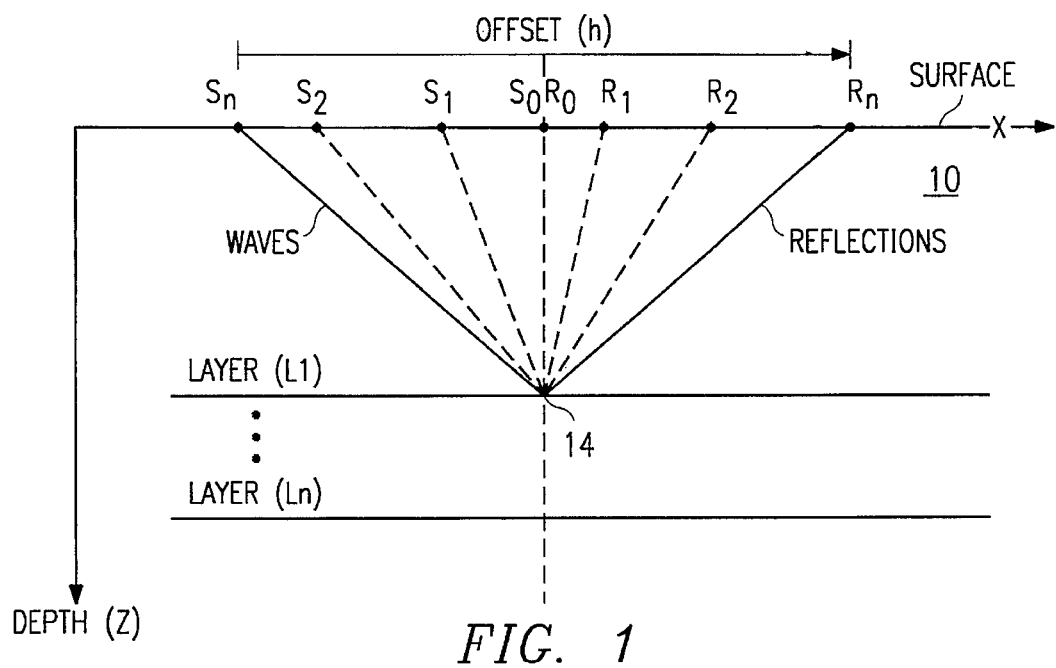
FIG. 1 is a cross-sectional view of a multiple layer earth model illustrating collection of seismic data by conventional common depth point (CDP) or common midpoint (CMP) prospecting.

FIG. 1 is a cross-sectional view of a multiple layer earth model 10 illustrating the collection of seismic data by conventional common depth point (CDP) or common midpoint (CMP) prospecting. During data gathering, sources S1, S2, . . . Sn are activated, typically in sequence, to generate descending acoustic waves which partially reflect off the interface (I) between each of the earth layers L1, L2, . . . Ln. The sources S1-Sn produce ascending reflection signals which are received by corresponding receivers R1, R2, . . . Rn, and recorded.

Figure 2:
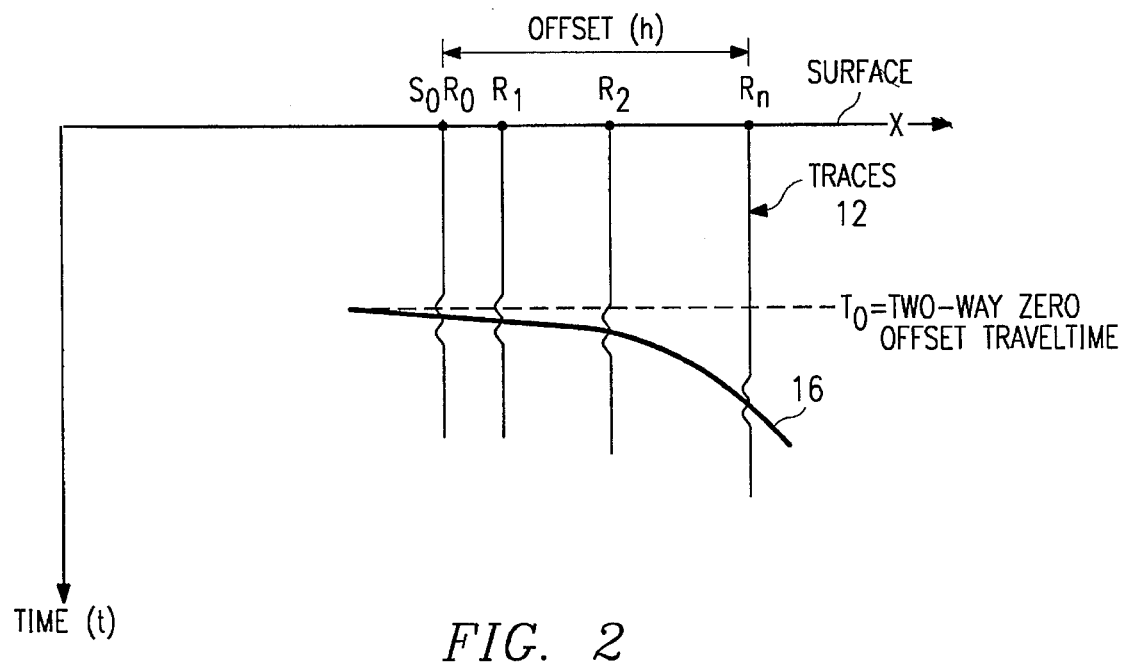
FIG. 2 is a schematic view of an x-t shot record produced by generating seismic energy into the into the earth model of FIG. 1 for a particular layer.

FIG. 2 illustrates schematically the x-t seismic record produced by generating seismic energy into the earth model 10 for the layer L1. When a number of traces 12 are ordered for a common depth point (CDP) 14 (FIG. 1) according to the displacement (offset (h)) of the corresponding receiver to source, and are gathered, i.e., displayed next to each other, a characteristic dipping shape in the wavelets in the traces is observed. This is an artifact which occurs because the CDP traces 12 recorded at longer source-to-receiver offsets correspond to longer traveltimes for the seismic energy. Such a systematic shift to longer reflection times (t) due to increasing source-receiver offset is referred to as normal moveout or "NMO". It is well known that NMO causes errors in determining both compressional and shear wave velocities which, if left uncorrected, will cause stacked amplitudes of seismic events to be misaligned, thereby masking the true characteristics of the reflecting interfaces (I).

Using conventional velocity stacking analysis, a hyperbola 16 may be fitted to the wavelets, or signals, illustrated in FIG. 2, for the seismic event at the CDP 14. It is understood that the hyperbola 16 is an approximation only, the true seismic event being nonhyperbolic.

Correction for NMO is performed utilizing conventional processing techniques whereby the traces 12 are compressed in time to compensate for the varying distance traveled by the energy from source to receiver. Ideally, an NMO correction method will flatten the seismic event for each layer represented by the hyperbola 16, along the time (t) axis to a value representing the zero-offset traveltime (T0).

As illustrated in FIGS. 3a–3b, NMO correction methods in practice tend to leave some residual moveout in the data, due to the non-hyperbolic nature of the seismic event. FIG. 3a shows a synthetic CDP record of a single seismic event. The seismic event is specified by a 25 Hertz Ricker wavelet and a nonhyperbolic traveltime (t) curve 300. The curve 300 represents the sum of a true hyperbola and a low wave number, low amplitude perturbation term. FIG. 3b shows a curve 302 representing correction of the seismic event for NMO using conventional techniques, leaving some residual moveout in the data. Specifically, a large residual moveout with a root mean square (rms) value of about 14 ms is still present, because of the nonhyperbolic nature of the seismic event. Uncorrected, this residual moveout will deteriorate the stacked trace when the traces are subsequently stacked to increase the signal-to-noise ratio. Furthermore, the non-hyperbolic component of the signal carries valuable seismic velocity information that unless promptly recovered will remain unutilized.

FIG. 3c illustrates a curve 304 in which the residual NMO for the seismic event has been corrected, utilizing a simulated annealing technique of the present invention, discussed in detail below. The result is a curve 304 which is substantially flat along the true zero offset traveltime ($T_0$) for the seismic event. As will be described, the invention accurately determines prestack traveltimes of selected seismic events by recognizing that the true prestack traveltime for each event is the sum of the best fit hyperbola solved by a velocity stacking analysis, and a perturbation term solved by a simulated annealing technique. The determination of prestack traveltimes in this fashion is easily automated. Specifically, the invention comprises an iterative method for optimizing a reference seismic velocity model in which prestack traveltimes of seismic events are determined using simulated annealing, described in detail below.

FIG. 4 is a flow chart illustrating a method of the present invention for optimizing a reference seismic velocity model that best describes the velocity variations in the subsurface.

The method of the present invention commences at step 400 with the acquisition of seismic data through the utilization of well known seismic exploration techniques for generating compressional energy into a subsurface formation and recording reflected waves from subsurface reflecting interfaces. The data is conventionally recorded as seismograms depicting seismic traces, representing the amplitude of seismic reflections as a function of time (t) and distance (x) along a path of exploration in the x direction of the earth's surface. The traces are typically gathered into an x-t array, referred to as a shot record, and subsequently, the data are regathered in common midpoint gathers and stacked. The normal incidence traveltimes $T_{OL}(x)$ are picked from the stacked section and the associated stacking velocities $V_{stL}(x)$ are determined as a function of CDP surface location (x) for a number of layers L. $T_{OL}(x)$ can be easily obtained by digitizing seismic events (also referred to as "horizons") of interest on a stacked section. $V_{stL}(x)$ is determined using a conventional velocity analysis in a window centered around $T_{OL}(x)$.

The purpose of the velocity analysis of step 400 is to refine the sampling of the stacking velocity field both in space and in time in order to maximize the signal-to-noise ratio of the samples. As with any velocity analysis technique, it involves an interpretive step of choosing among several coherence peaks. Preferably, the selected seismic events on the stacked section will be those with the best signal-to-noise ratio, which makes picking the best stacking velocity an easy task.

Figure 5:
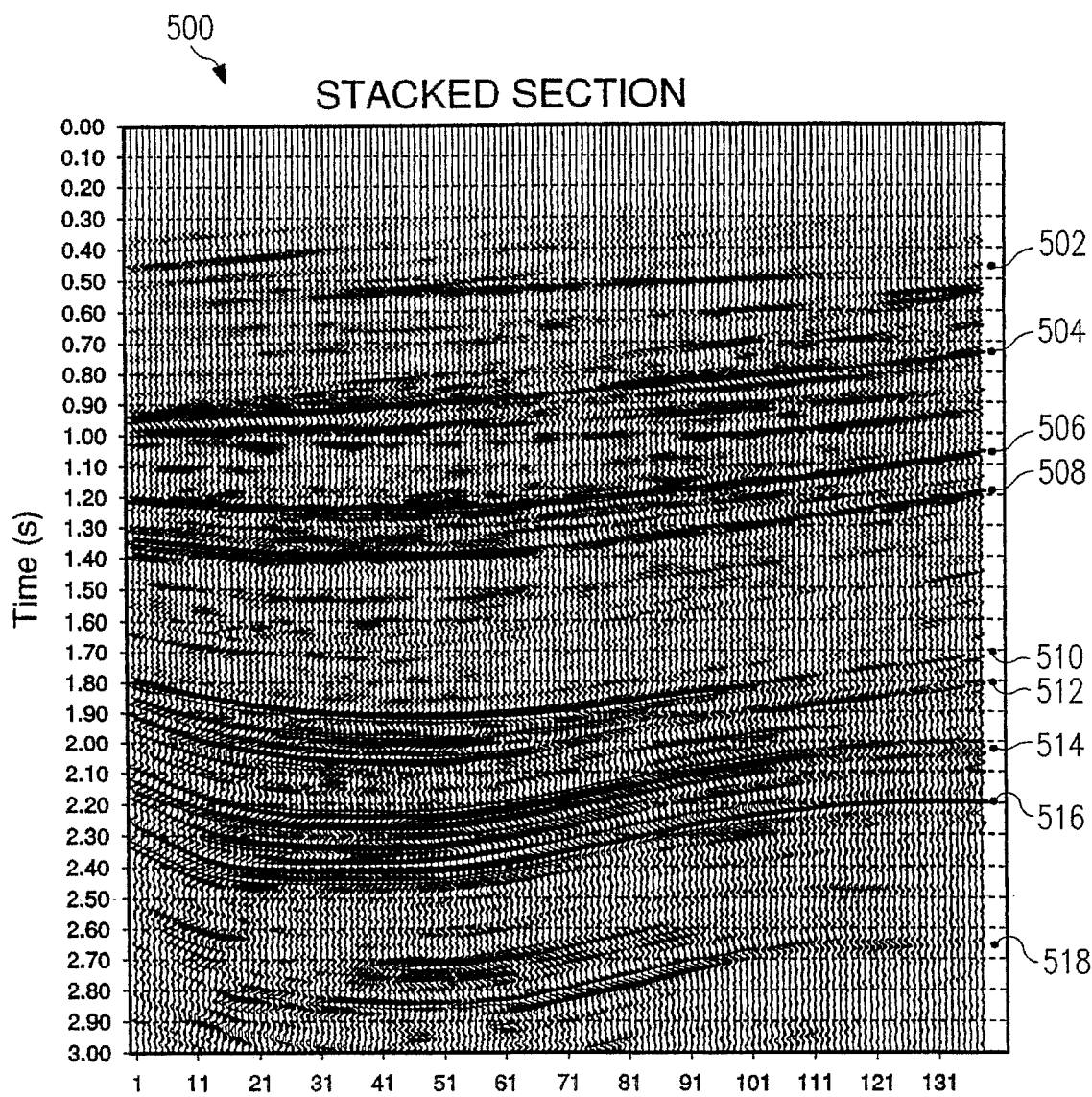
FIG. 5 illustrates a sample stacked section from a marine data set in which nine seismic events of variable signal-to-noise ratio are identified.

FIG. 5 illustrates an example stacked section 500 from a marine data set in which nine seismic events 502–518 of variable signal-to-noise ratio have been identified. The events 502–518 were digitized and the stacking velocities ($V_{stL}(x)$) were determined using standard seismic processing software.

Figure 6:
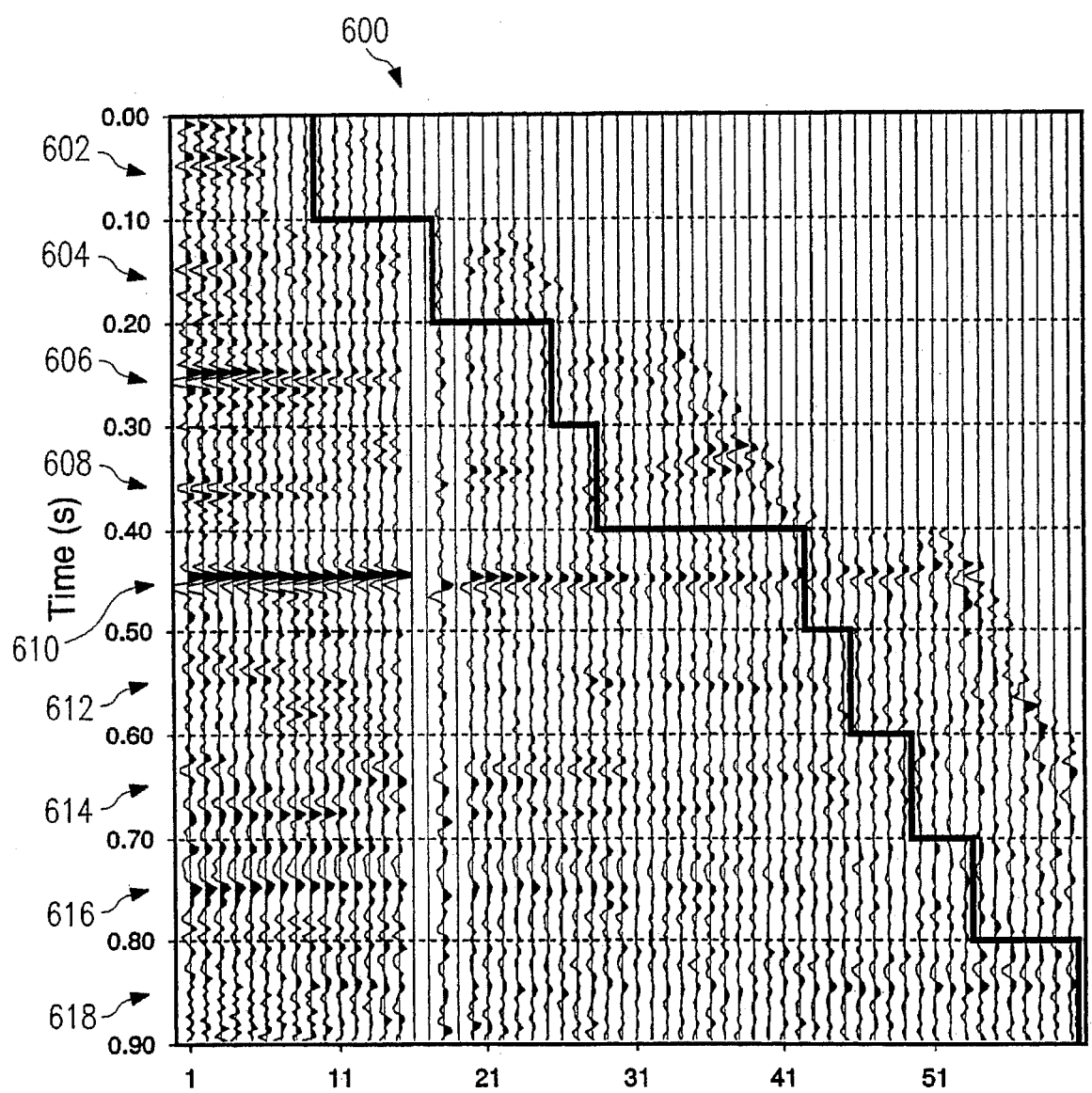
FIG. 6 illustrates the nine prestack seismic events of FIG. 5 from a single CDP gather after correction for NMO, with each event occupying a 100 millisecond window.

FIG. 6 illustrates a section 600 representing NMO corrected seismic events for a single CDP gather from the section 500 of FIG. 5. Shown are 100 ms windows 602–618 centered around the best fit hyperbolas for all nine events 502–518 (FIG. 5). To improve the visual perception, the windows 602–618 are stacked on top of each other proceeding from the shallowest event in the window 602 to the deepest event in the window 618. If the events 502–518 were truly hyperbolic, and the hyperbolas were accurately recovered by conventional velocity analysis, then each event would appear as a flat line at the center of the corresponding window 602–618. The section 600 shows some residual moveout, most prominent in windows 606 and 608. Several reasons account for the residual moveout, which include the nonhyperbolic nature of the prestack traveltimes at large offset-to-depth ratios, and the unequal amplitude level of the events across offset. For events with decreasing amplitude with offset, the near traces enter the semblance calculation (discussed in detail below) with a higher weight than the far traces, and as a result most attention is given to aligning the near offsets rather than the far offsets. The event in window 606, for example, was found in some CDPs to exceed 30 ms of the residual moveout at the farthest offset.

Figure 7:
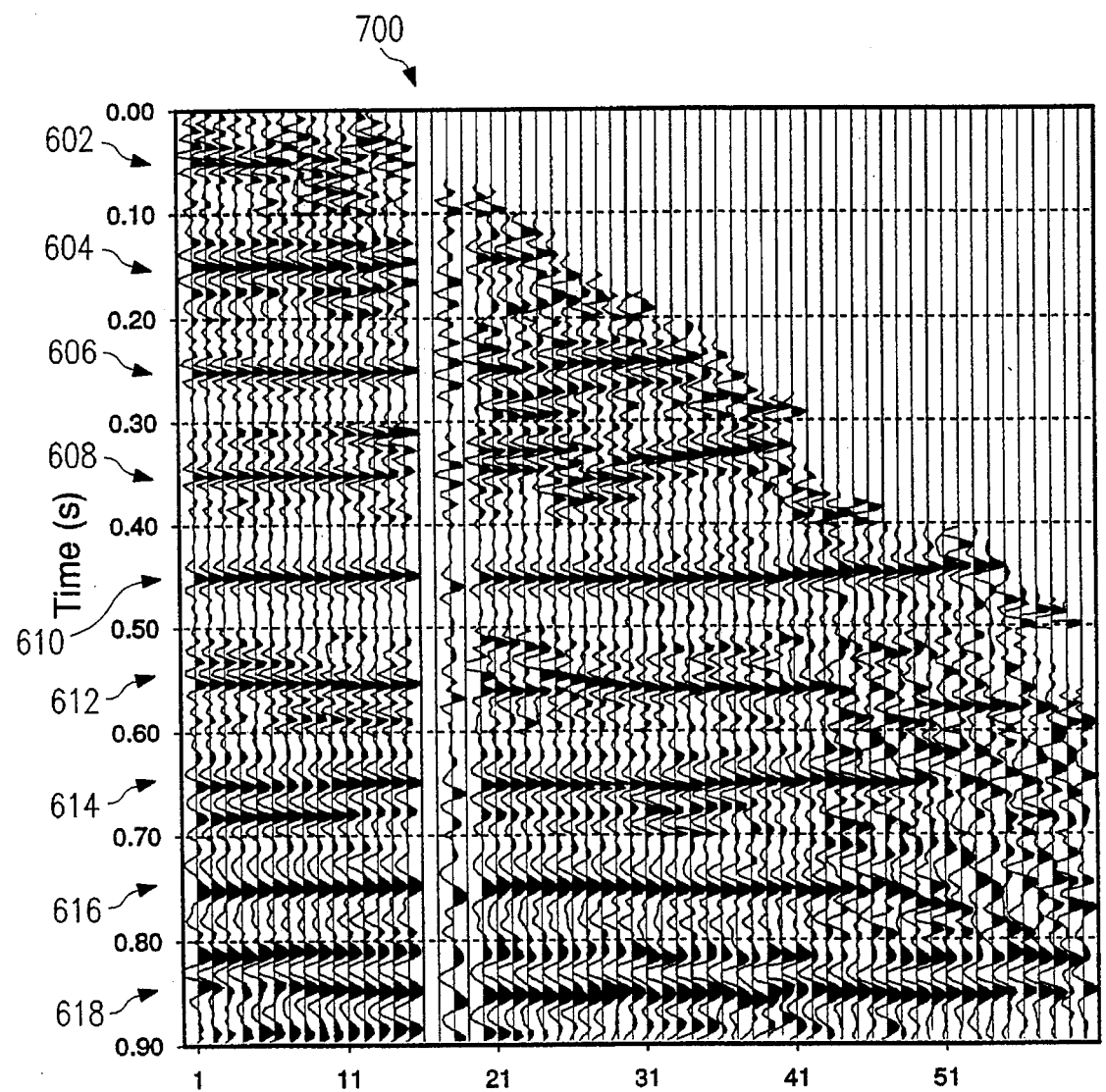
FIG. 7 illustrates the seismic events shown in FIG. 6 after normalized cross correlations with the stacked trace of the particular CDP gather.
Figure 10B:
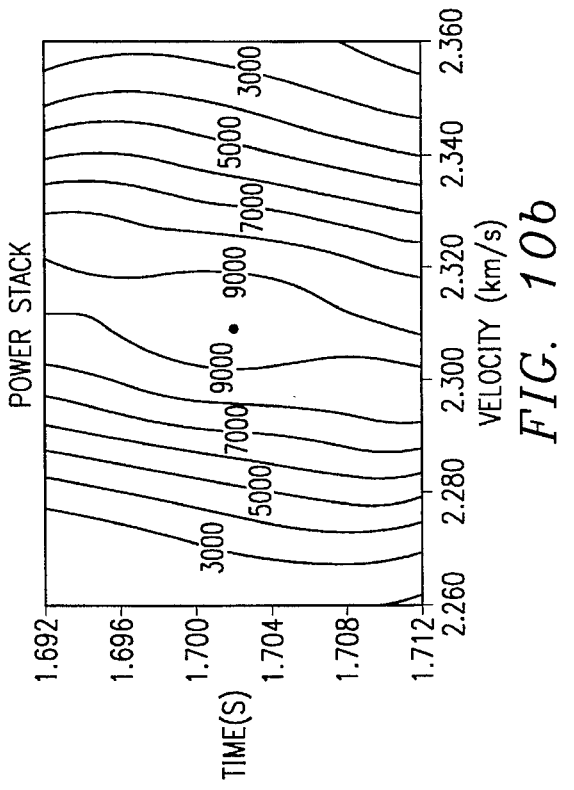
FIGS. 10a–10c illustrate semblance, power stack and weighted power stack, respectively, as a function of $T_0$ and V, which parameters specify the hyperbolic event of FIG. 9.
Figure 10A:
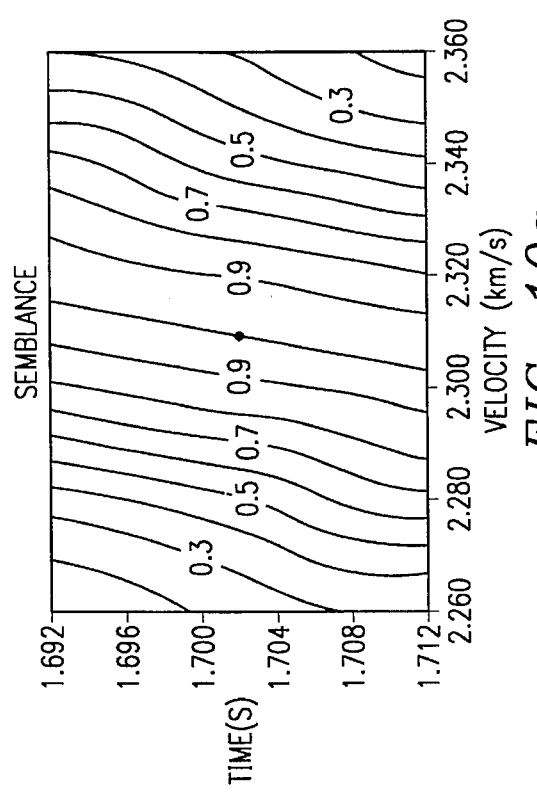
Figure 10C:
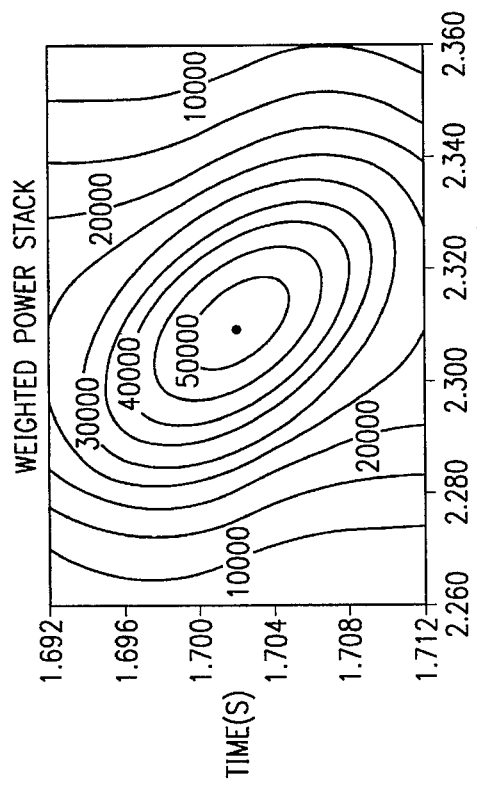

FIG. 7 illustrates a section 700 having normalized cross-correlations between the prestack trace windows 602–618 of FIG. 6 and the corresponding window of the stacked trace at the same CDP location. This is performed to equalize the amplitude level of each event across all offsets, and to obtain a pseudo-zero phase wavelet. Zero-phase wavelets help the convergence of the simulated annealing algorithm because they enhance the relief of the topography of the objective function (FIG. 10a, 10b, 10c). The events illustrated in FIG. 7 constitute the input for the residual NMO calculation using simulated annealing, discussed in detail below.

Figure 8:
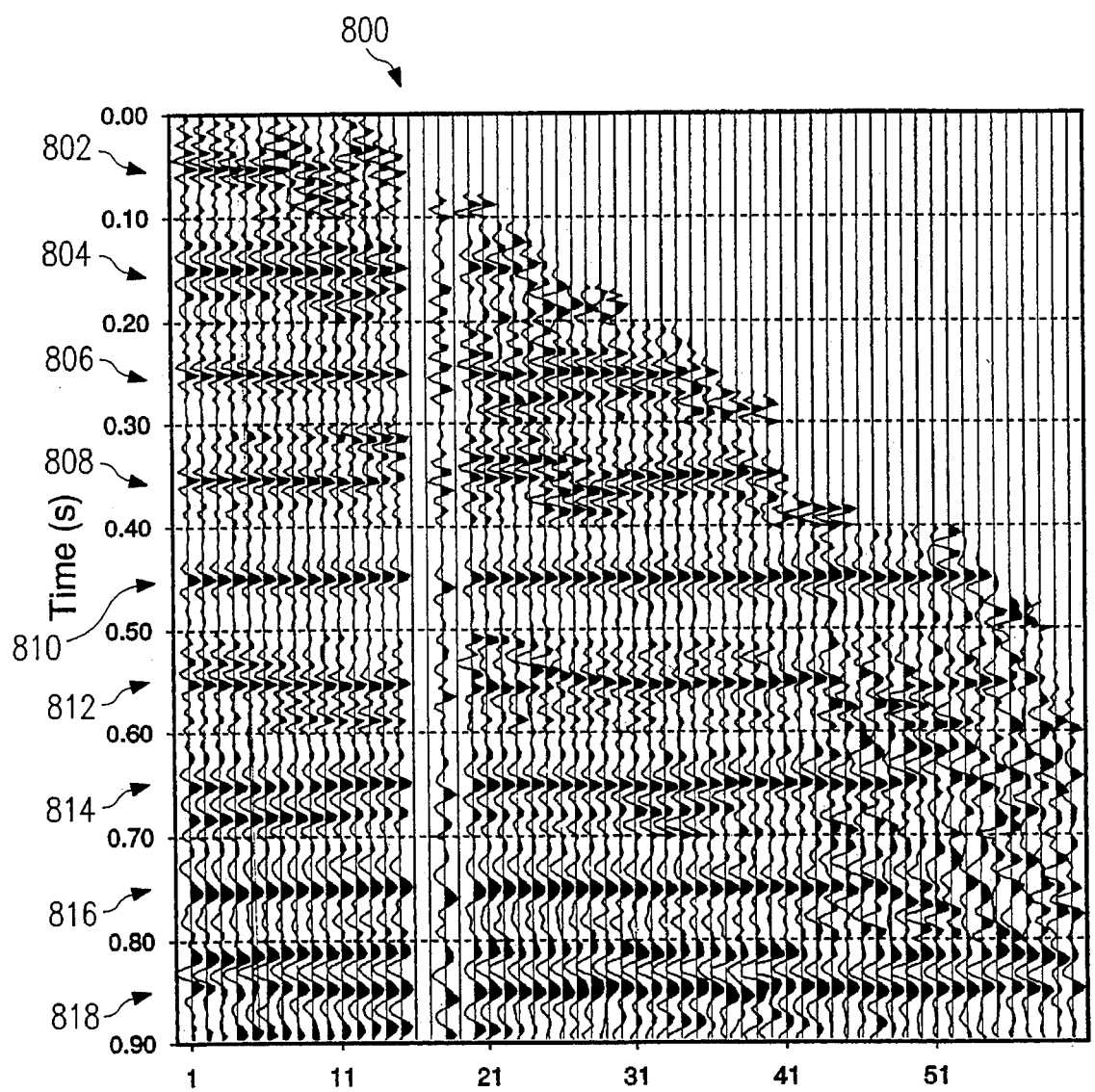
FIG. 8 illustrates the seismic events shown in FIG. 6 after correction for NMO using prestack traveltimes determined using the simulated annealing technique of the present invention.

FIG. 8 illustrates a section 800 in which the crosscorrelation procedure discussed above is repeated, using the prestack traveltimes determined from the simulated annealing process, rather than from the hyperbolic traveltime curves. The simulated annealing process is discussed in detail below. In FIG. 8, the extent to which the true traveltimes are accurately determined is reflected upon the alignment of the crosscorrelation peak of each event at the center of the corresponding window 802–818. Simulated annealing recovers the underlying smooth traveltime structure well for all of the events, despite the missing traces and the strong interference in some of the events, as in windows 808, 812 and 816.

Referring again to FIG. 4, once the seismic data input parameters $T_{0L}(s)$ and $V_{stL}(x)$ have been determined in step 400, the velocity model optimization method of the invention proceeds to step 402. In step 402, a residual NMO calculation is performed. Specifically, the true prestack traveltime curve ($T_L(x, h)$) for seismic event L at a fixed CDP location x as a function of offset distance h is determined by summing the best fit hyperbola from the conventional velocity analysis with a perturbation term, i.e.,:

$$T_L(x,h) = \left[ T_{0L}^2(x) + \frac{h^2}{V_{stL}^2(x)} \right]^{1/2} + \Delta T_L(x,h),$$

where $\Delta T_L(x, h)$ is the perturbation term. The hyperbolic term in the above equation is known based on the input parameters of 2-way normal incidence traveltime $T_{0L}(x)$ and stacking velocity $V_{stL}(x)$. The perturbation term, i.e., $\Delta T_L(x, h)$, constitutes the nonhyperbolic component to be recovered from the data using the simulated annealing method of the present invention.

The curve $\Delta T_L(x, h)$ as a function of offset h can take any arbitrary shape, depending on the velocity distribution of the overlying sediments. To accommodate this condition by expanding $\Delta T_L(x, h)$ in the interval $(h_{min}, h_{max})$, where $h_{min}$ is defined as the minimum offset distance between the seismic source and any of the geophones and $h_{max}$ is defined as the maximum such distance, in terms of cubic B-spline basis functions $F_i(h)$:

$$\Delta T_L(x,h) = \sum_{i+1}^{M+3} c_{iL}(x) F_i(h),$$

where M+3 corresponds to the total number of basis functions used and $c_{iL}(x)$ are the spline coefficients. Recovery of the nonhyperbolic component in the data $\Delta T_L(x, h)$ involves estimating the values of the spline coefficients $C_{iL}(x)$, for i=1 to M+3. The number of spline coefficients may be adjusted as a function of the CDP location x and vertical traveltime $T_0$ to reflect changes in the signal-to-noise ratio of the data.

Figure 9:
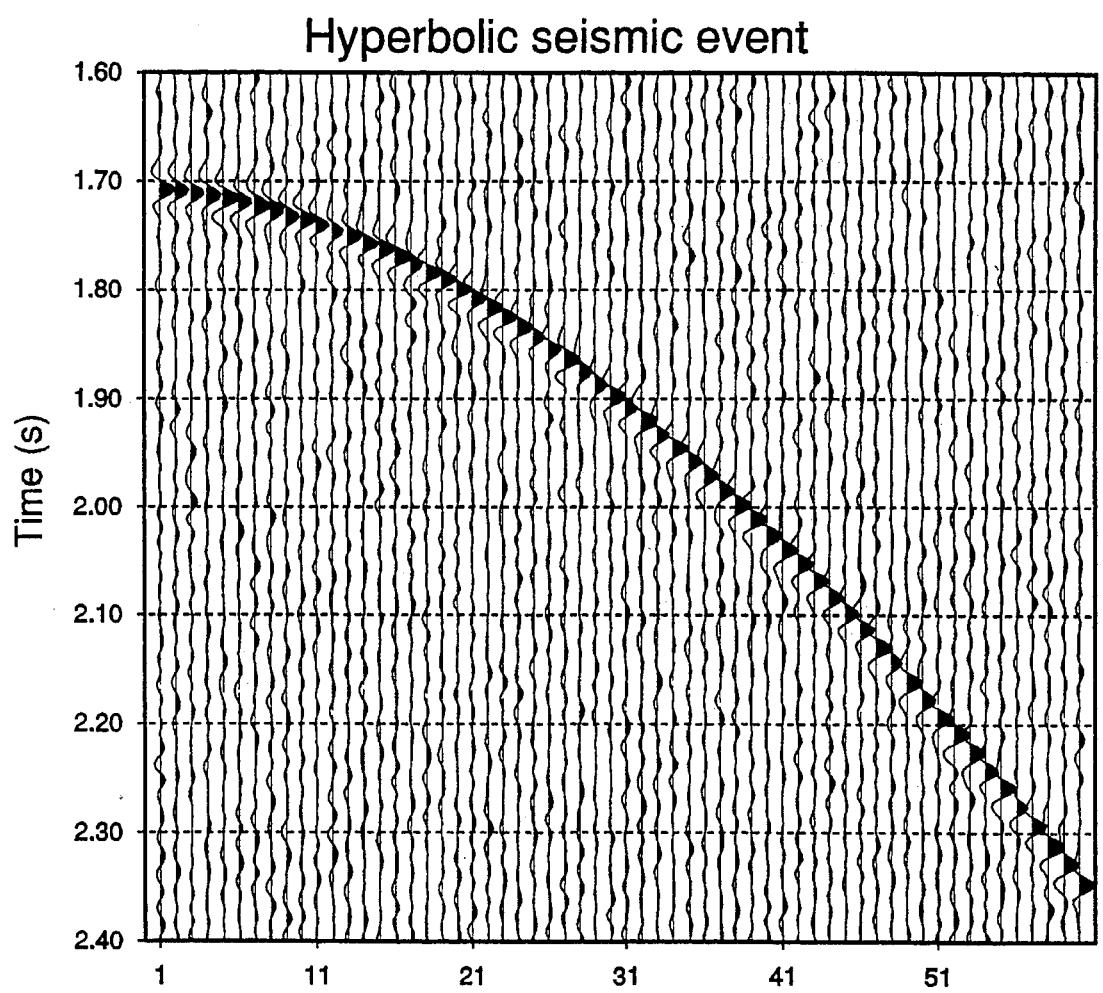
FIG. 9 illustrates a hyperbolic event used for testing three different objective functions.

In order to automate the procedure of determining $\Delta TL(x, h)$, an energy function that can be measured along any proposed curve $\Delta T_L(x, h)$ must be defined so that a computer can perturb the curve $\Delta T_L(x, h)$ until the energy function is optimized (i.e., maximized or minimized). A proper choice for such energy function is critical for the success of the method. Accordingly, rather than using energy functions of semblance and power stack, which functions are commonly used in geophysics, a time-weighted power stack of the stacked trace with the prestacked trace is used. The normalized crosscorrelation approximately changes the waveform of the prestack seismic event the traveltime of which is being measured to zero phase and to unit amplitude at all offsets (FIG. 7). The time-weighted power stack of a zero phase normalized wavelet is an energy function the relief of which is accentuated and therefore its maximum or minimum is better defined and easier to detect. FIGS. 10a–10c are contour plots of semblance, power stack and weighted power stack, respectively, as a function of $T_0$ and V, which are the two parameters that define the hyperbolic event illustrated in FIG. 9.

To maximize the time-weighted power stack of the data (FIG. 10c) along an arbitrary curve defined by M+3 spline coefficients would require a search for the maximum in (M+3)-dimensional space. Therefore, rather than carrying out a direct search for the maximum by evaluating the weighted power stack on a grid of points in this multidimensional space, an optimization method herein referred to as "simulated annealing" is used. Simulated annealing allows for a computationally efficient search, while at the same time achieving convergence of the solution to the desired global maximum rather than to a less desirable local maximum.

Simulated annealing is an optimization method in which the multiparameter model space is sampled randomly. Unlike iterative approaches, simulated annealing accepts points in model space that degrade, rather than improve, the solution. Assuming that the function to be optimized has a minimum, transitions from point i to point j such that $\Delta E_{ij}=E(j)-E(i)<0$ are accepted with probability one. Transitions with $\Delta E_{ij}>0$ are accepted only if $G(\Delta E_{ij})<P_r$, where $G(\Delta E_{ij})$ is some specified function of $\Delta E_{ij}$ and $P_r$ is a random number drawn from a uniform distribution in the interval [0,1].

The original $G(\Delta E_{ij})$ proposed by Metropolis et al. in their article "Equation of State Calculations by Fast Computing Machines," 21 *J. Chemistry & Physics* 1087–92 (1953), is of the form $G(\Delta E_{ij})+\exp(-\Delta E_{ij}/p_k)$, where $p_k$ is a constant that is gradually reduced during the search for the global optimum. Analogous to the crystallization of a heated metal (a process commonly referred to as "annealing"), $p_k$ is often called the "temperature parameter" and the way it is changed is referred to as the "cooling schedule".

A more general function $G(\Delta E_{ij})$ was introduced by Bohachevsky et al. in "Generalized Simulated Annealing for Function Optimization," 28 *Technometrics* 209–17 (1986). Transitions that deteriorate the solution, i.e., $\Delta E_{ij}>0$, are accepted with the probability $$G(\Delta E_{ij}) = \exp\left( \frac{-\Delta E_{ij}}{p(E(i) - \overline{E}_{opt})} \right),$$

where $\overline{E}_{opt}$ is an estimate of the global minimum of the objective function. The algorithm is run at a constant p and the extra denominator term $p(E(i)-\overline{E}_{opt})$ ensures that the probability of accepting deteriorations tends to zero as the algorithm approaches the global minimum.

Unfortunately, the acceptance criterion of Bohachevsky et al. does not guarantee convergence. Its form is such that once a deterioration $\Delta E$ has been accepted, another deterioration of equal amount can be accepted with a higher probability than the previous one. In other words, the solution tends to accelerate away from the global minimum, an undesirable result. In addition, the approach depends on an accurate estimate $\overline{E}_{opt}$ of the global minimum, which is not always available.

Successful implementation of simulated annealing is problem specific and requires experimentation and experience. Because the objective function for the problem at hand has local optima that are on the same order of magnitude as the global optimum (primarily as the result of interference of other forms of coherent seismic energy, such as multiply reflected energy, shear waves, ground roll, etc.), none of the above definitions for G(ΔEij)) yields satisfactory results.

Therefore, in a preferred embodiment, an acceptance criterion similar to that discussed above is used which does not depend on the current solution E(i) and which avoids a predetermination of $\overline{E}_{opt}$. Transitions from point i to point j in model space that deteriorate the solution are accepted with a probability $$G(\Delta E_{ij}) = \exp\left(\frac{-(E(j) - E_{min})}{p_k}\right)$$

where $p_k = f(E_{max} - E_{min})$ and $E_{min}$ and $E_{max}$ are the minimum and maximum values, respectively, of the energy function encountered so far since the beginning of the cooling process. The difference $E_{max} - E_{min}$ is the maximum relief of the objective function measured from the deepest known valley to the highest known peak. Thus, the value $E_{max} - E_{min}$, rather than the value $\overline{E}_{opt}$, is used to run the algorithm with varying temperature that reflects changes in $E_{max} - E_{min}$ during cooling. The function used for $p_k$, then, is of the form $P_k = \alpha^k(E_{max} - E_{min})$ wherein α is a constant less than one.

Unlike other cooling schedules, in the proposed algorithm, the temperature does not decrease monotonically. Instead, any time a new value of $E_{min}$ or $E_{max}$ is found, the temperature is temporarily increased. This increase can be regarded as a scale adjustment, because for a fixed k, the ease with which the solution exits the valley of $E_{min}$ remains relatively constant, independent of the particular depth of the point $E_{min}$. An additional advantage of the new criterion is that no evaluation of the multiparameter cost function E at different points prior to the beginning of the cooling schedule is necessary for the average properties to be measured and an initial value of the temperature to be determined.

Figure 11:
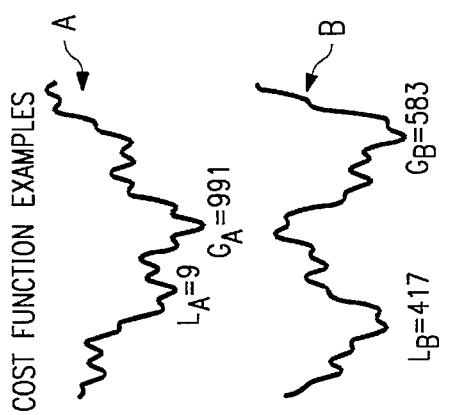
FIG. 11 illustrates two cost functions with different topographies in which location of the minimum is achieved using the simulated annealing technique of the present invention.

As an example, consider the one-dimensional case presented in FIG. 11. Curve A has an overall concave up shape with a well defined global minimum $G_A$ and a minor secondary local minimum $L_A$. Curve B has a sinusoidal overall shape with a global minimum $G_B$ and a distant major local minimum $L_B$. Other local minima of secondary importance are also present in both curves. Curves A and B are defined analytically as the sum of a few sinusoids of different amplitude and phase. To illustrate the importance of the topography of the cost function on the performance of the simulated annealing algorithm, the same experiment of locating the global minimum was repeated one thousand (1000) times for each curve with different starting points $x_o$ but identical cooling schedules. The starting points for each curve are uniformly distributed in the x direction in the domain of definition of the two curves. Also, it would take an average of twenty (20) steps to cover the full length in x, assuming movement only in one direction. As shown in FIG. 11, the solution based on the Metropolis et al. criterion converged to point $G_A$ 991 times out of 1000 runs, but to $G_B$ only 583 times, the remainder being trapped in $L_B$. By comparison, repeating the same experiment using the acceptance criterion and simulated annealing technique of the present invention, the solution converged to $G_A$ 1000 times and to $G_B$ 996 times out of 1000 runs.

Figure 12:
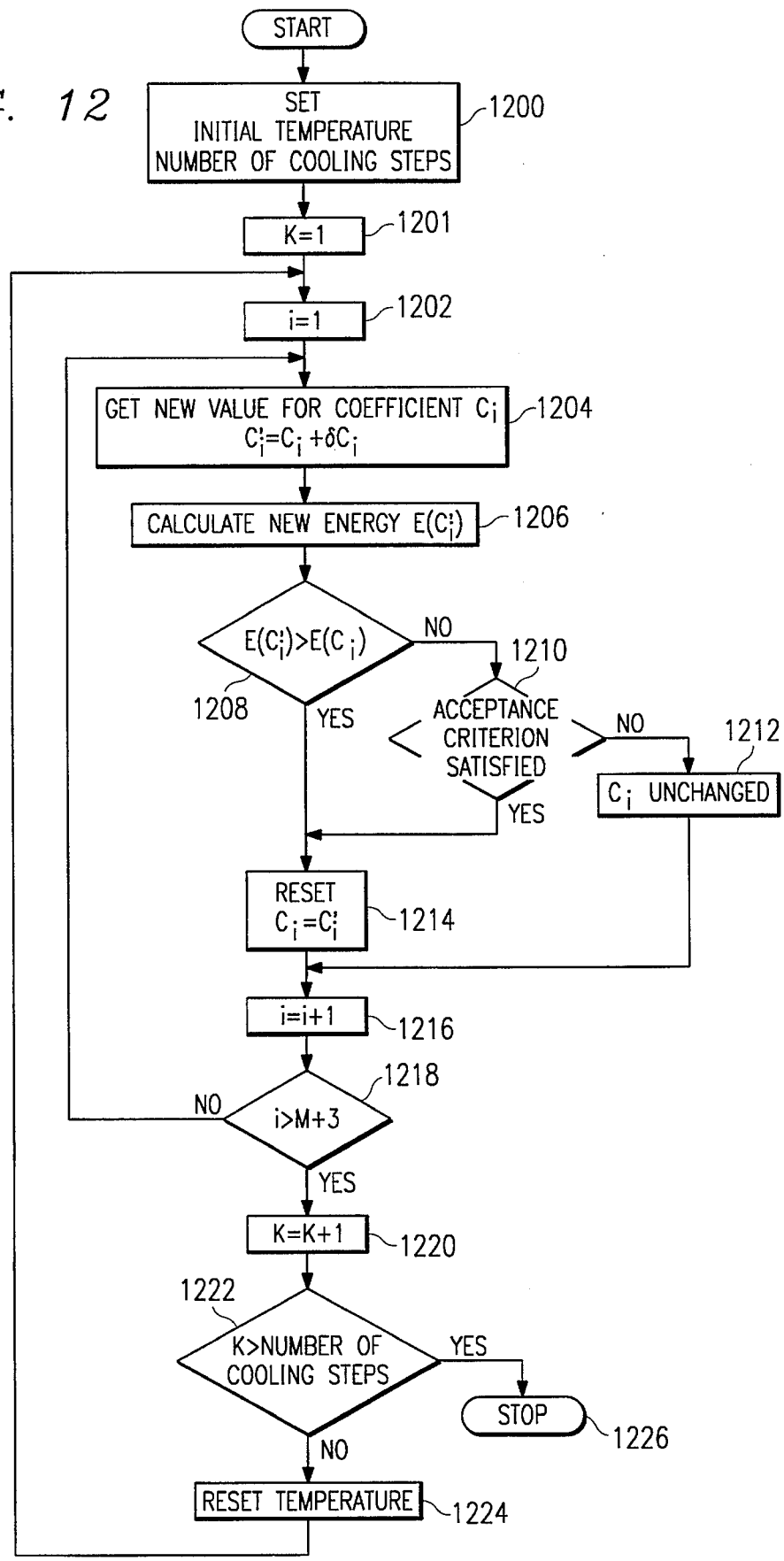
FIG. 12 is a flowchart of a simulated annealing process of the present invention.

In FIG. 12, execution of the simulated annealing algorithm begins in step 1200, in which the initial temperature and the number of cooling steps are set to predetermined values The number of cooling steps is set to about 500 and has been proved adequate by experimentation. The initial temperature value is any arbitrary positive constant. It is set to a fraction of the cost function E the first time E is calculated. In step 1201, the variable k is set equal to 1. In step 1202, the variable i is set equal to 1. In step 1204, a new value for the coefficient $c_i$, is obtained by $c'_i = c_i + \delta c_i$. In step 1206, a new energy coefficient $E(c'_i)$ is calculated as a weighted power stack along a traveltime curve that accounts for the new value of coefficient $c_i$. In step 1208, a determination is made whether $E(c'_i)$ is greater than $E(c_i)$. If not, execution proceeds to step 1210, in which a determination is made whether the acceptance criterion is satisfied. If not, execution proceeds to step 1212, and $c_i$ remains unchanged.

If in step 1208, $E(c'_i)$ is greater than $E(c_i)$ or if in step 1210, the acceptance criterion is satisfied, execution proceeds to step 1214. In step 1214, $c_i$ is set equal to $c'_i$. In step 1216, the variable i is incremented by 1. In step 1218, a determination is made whether i is greater than the variable M+3. If not, execution returns to step 1204. Otherwise, execution proceeds to step 1220. In step 1220, the variable k is incremented by 1. In step 1222, a determination is made whether the variable k is greater than the number of cooling steps (step 1200). If so, execution of the algorithm is complete in step 1224. Otherwise, execution proceeds to step 1224, in which the temperature is reset to a fraction of what it is, and then returns to step 1202.

As illustrated in FIGS. 13a and 13b, to improve performance, the solution is bounded by a window ±W(h) centered around the best fit hyperbola from the velocity analysis step. A hyperbolic window is usually used; however, other window shapes could also be used. The moveout at the far offset can be easily specified after visually inspecting NMO-corrected records. Because of the use of a nonflat window, the domain of definition $[-\Delta c_i, +\Delta c_i]$ is different for each spline coefficient $c_i$ and $v_i$ such that:

$$W(h) = \sum_{i=1}^{M+3} \Delta c_i F_i(h),$$

where $T_0(h)$ are the spline basis functions.

To speed convergence, the trial step size $\delta c_i$, used for changing the spline coefficient $c_i$ to a new value, initially averaging $\Delta c_i/2$, is decreased as temperature is lowered. This biased generation of transitions is based on the fact that as the algorithm converges, large length transitions are more likely to be rejected, thus increasing the computational cost. In the preferred implementation, the step size $\delta c_i$ at each temperature step k is adjusted so that its average value becomes:

$$\overline{\delta c_i}|_k = \beta^k \frac{\Delta c_i}{2},$$

where β is a constant less than one.

Using the method of simulated annealing, convergence to an event other than the desired one, such as a multiple or an adjacent primary, is always a small but real possibility. Unlike conventional methods, whereby the tracked traveltime trajectory of an event in one ensemble is used as a guideline for the traveltime trajectory search in the adjacent ensemble, simulated annealing treats the event at each ensemble independently. As a result, mispicked events are not spatially correlated and can be easily eliminated in a single step.

Recall that the traveltime $T_L(x, h)$ of an event L at CDP x and offset h is given by:

$$T_L(x,h) = \left[T_{0L}^2(x) + \frac{h^2}{V_{stL}^2(x)}\right]^{1/2} + \Delta T_L(x,h),$$

where $T_{0L}$ and $V_{stL}$ are input parameters and $\Delta T_L(x, h)$ is the traveltime perturbation determined by simulated annealing.

Each value of $T_L(x, h)$ corresponds to a point and the totality of points for a single seismic horizon (L=cnst) can be fit by a two-dimensional surface $S_L(X, h)$ which should meet similar smoothness criteria as the individual curves $T_L(x=$ cnst, h). Mispicked events will lie outside the smooth surface $S_L(x, h)$ and can be identified as follows.

The root mean square misfit error between the measured $T_L(x, h)$ and the smooth two-dimensional surface $S_L(x, h)$ at fixed CDP location x may be defined as:

$$Err_L(x) = \frac{1}{\sqrt{Nh}} \left[ \sum_h (T_L(x,h) - S_L(x,h))^2 \right]^{1/2}$$

and the root mean square error between those two functions at all offsets and all CDPs is:

$$\overline{Err_L} = \frac{1}{\sqrt{NhNx}} \left[ \sum_x \sum_h (T_L(x,h) - S_L(x,h))^2 \right]^{1/2},$$

where Nh is the number of offsets and Nx is the total number of CDPs. Mispicked events $x_{me}$ are defined as those with a high misfit error:

$$Err_L(x_{me}) \geq \gamma \overline{Err_L},$$

where $\gamma$ is a real number. Ignoring points $T_L(x_{me}, h)$ a new surface $S'_L(x, h)$ is refit and $S'_L(X_{me}, h)$ is substituted for $T_L(x_{me},h)$. In practice, this process is repeated, with one point being rejected at a time. This procedure is repeated independently for every interface L. Typically, the number of mispicked events does not exceed three percent, but the dropped events $T_L(x_{me},h)$ have a dramatic effect on the standard deviation of the surface misfit $\overline{Err_L}$.

Referring again to FIG. 4, after $T_L(x, h)$ have been determined for each event by simulated annealing, the method proceeds to step 404, in which an initial seismic velocity model V(x,z) is constructed.

In step 406, model traveltimes $T_{cal}(x, h)$ are determined by map migrating the picked events on the seismic section from time to depth and then ray tracing the model in a conventional fashion.

The calculated traveltimes $T_{cal}(x, h)$ from step 406 are compared with the observed traveltimes $T_{0L}(x, h)$ from step 402. In step 408, a determination is made whether a error norm is satisfied, i.e., whether $|T_{0L}-T_{cal}|$ is less than a given number. If so, then the model provides an accurate representation of the subsurface and execution ends in step 410. Otherwise, execution proceeds to step 412, in which the velocity model is updated. It should be understood that ray tracing is possible because in its propagation, a ray follows certain physical laws that determine its change in direction. In turn, these physical laws are dependent upon the distribution of the velocity in a subsurface. This means that at any given point, it must be known where the ray is in the model, what the next interface in its path is, and what the velocity of the layer on the other side of the interface is. The above requirements introduce a need for a topological, i.e., relative position, representation of layers in the model.

In routine geophysical practice, the seismic velocity model is represented by layers of constant vertical and constant or smoothly varying lateral velocity. The layer boundaries are usually chosen to correspond to the top of major geologic rock formations as interpreted from well logs or to major events identified on the seismic section. In most cases, these layers are present only over part of the section. They typically truncate against faults, or are intruded by salt, or they have been partially eroded away from previous exposure at the earth's surface (unconformities), or they thin out laterally (pinch out), or any combination of the above. The degree of complexity of a subsurface model is practically unlimited.

Given that the potential structural complexity of the subsurface is virtually unlimited, such representation is not always easy. Furthermore, tracing rays in a complicated model can become computationally prohibitively expensive. Therefore, according to the method of the present invention, a smooth, rather than a discontinuous, velocity model is constructed in step 404 and the sense of layering is preserved via geometric constraints used when solving for the velocity updates (step 412), as described below. This velocity field may be described in terms of two-dimensional spline coefficients:

$$V = \sum_{ij} c_{ij} A_i B_j \tag{1}$$

where $c_{ij}$ are the spline coefficients and $A_i$ and $B_j$ are basis functions in the x and y directions, respectively.

In estimating the velocity model, an iterative scheme is used, whereby starting with an initial guess velocity model (step 402), the model is incrementally changed so that with each iteration, the predicted traveltimes better match the observed traveltimes (step 408). Mathematically this is achieved by solving a system of linear equations comprising two subsystems, one that seeks to minimize the residual error and another that implements the constraints, i.e., $$G\delta c = T_{obs} - T_{cal} \tag{2}$$

$$F\delta c = 0 \tag{3}$$

where $\delta c = \delta c_{ij}$ is the amount of change in the two-dimensional matrix of spline coefficients that describes the velocity model, $T_{0L} - T_{cal}$ is the difference between the real and the calculated traveltimes at the current iteration that is sought to be minimized in a least squares sense, and G is the Frechet derivative matrix $$\frac{\delta T_{cal}}{\delta c_{ij}}$$

that expresses the change in the observed traveltimes corresponding to a change in the model parameters. The elements of the matrix G are calculated simultaneously with $T_{cal}$ during raytracing.

Figure 14:
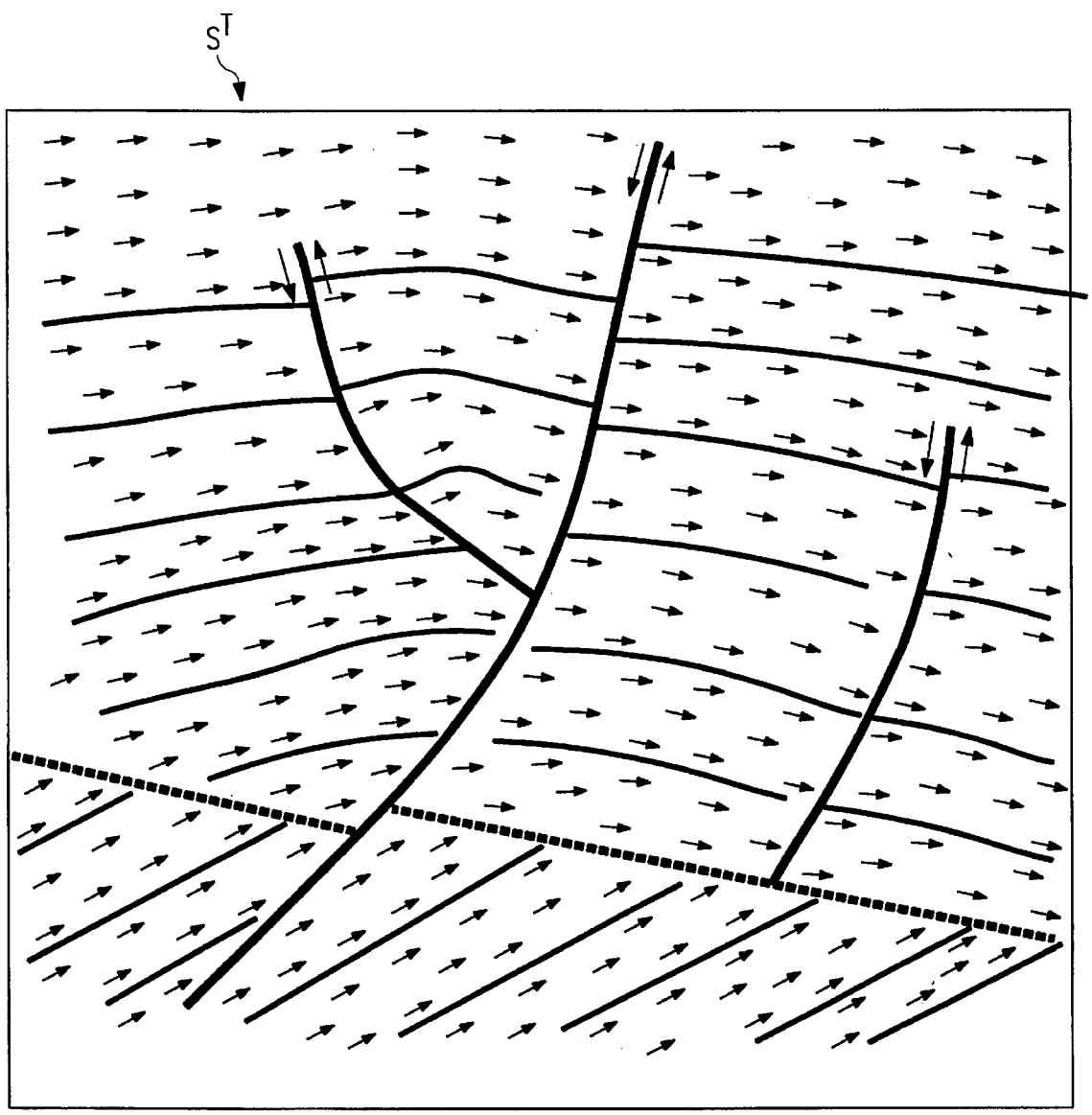
FIG. 14 illustrates a unit vector field sT which is parallel to subsurface layers.

Referring to FIG. 14 the calculation of the elements of matrix F will be explained. After map migration of the seismic horizons from time to depth is completed, a unit vector field $s^T$ is defined that parallels the layers and constitutes a continuous representation of the layering at the current iteration. At layer boundaries, the direction of $s^T$ is defined as the tangent to the boundaries. Between layer boundaries, the x and y components of $s^T$ are obtained by linear interpolation in the depth direction. $s^N$ is defined as a unit vector normal to $s^T$.

Figure 15:
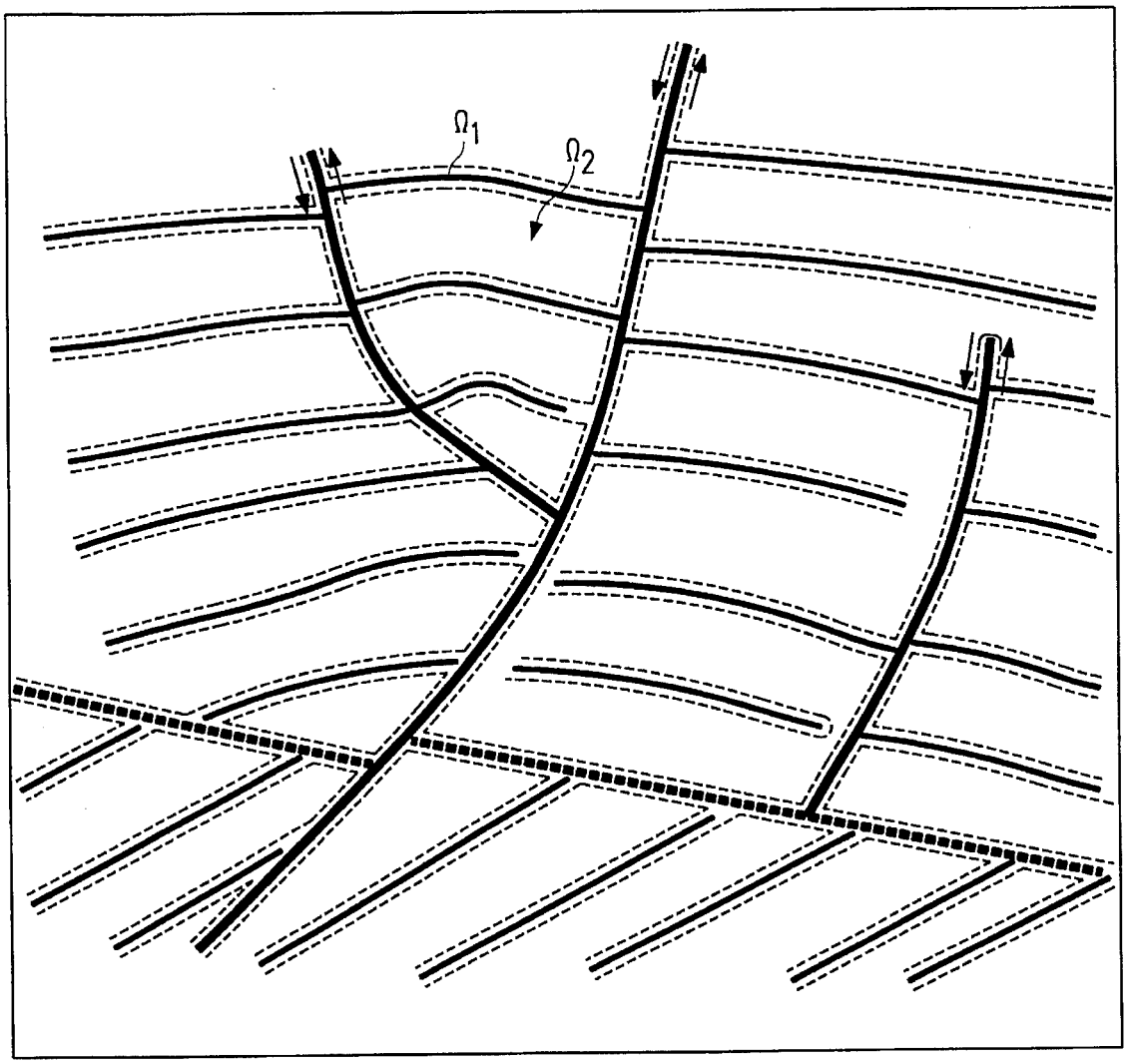
FIG. 15 illustrates two domains $\Omega_1$ and $\Omega_2$ of the subsurface layers shown in FIG. 14.

As shown in FIG. 15, the subsurface model is further subdivided into two domains, $\Omega_1$, which is comprised of small bands bracketing the layer boundaries and the discontinuities in depth, and $\Omega_2$, which is comprised of the rest of the model. The velocity is required to be updated in such a way that the velocity field remains fairly constant in the direction perpendicular to the layering in $\Omega_2$, whereas it undergoes maximum changes in $\Omega_1$. In essence, the two-dimensional velocity update field is required to resemble a surface that has different flexural rigidity between interfaces than in the vicinity of the interfaces. In mathematical terms, the gradient of the velocity updates is required to be parallel to the layering in $\Omega_2$ and perpendicular to the layering in $\Omega_1$, which is achieved by minimizing:

$$F_1 = \frac{\omega_1}{\Omega_1} \left[ \int_{\Omega_1} (\nabla \delta V \cdot s^T)^2 \, dx \, dy \right] + \frac{\omega_2}{\Omega_2} \left[ \int_{\Omega_2} (\nabla \delta V \cdot s^N)^2 \, dx \, dy \right] \quad (4)$$

Minimization of $F_1$ provides the necessary geologic constraints that maintain the sense of layering while using a smooth rather than a layered model. The coefficients $\omega_1$ and $\omega_2$ are weights expressing the relative importance of the two terms in the sum.

It is well known in the geophysical literature that certain sinusoidal components of the velocity field cannot be resolved from the data. For example, a sinusoidal perturbation could be added laterally to the velocity of a layer without noticeable effect on the observed traveltimes. Since the data are not sensitive to such perturbations, the solution will be unstable unless properly damped. Suppression of these components of the velocity field is achieved by requiring that the curvature of the wave field parallel to the layering is minimized, i.e., $$F_2 = \frac{w_3}{\Omega_2} \left[ \int_{\Omega_2} (\nabla(\nabla \delta V \cdot s^T) \cdot s^T)^2 \, dx \, dy \right] \quad (5)$$

Substitution of equation (1) into equations (4) and (5) results in the subsystem of linear equations described by equation (3). The combined solution of equations (2) and (3) is given by:

$$\delta c = [G^T G + \epsilon F^T F]^{-1} G^T (T_{obs} - T_{cal}), \quad (6)$$

which yields the updates to the spline coefficients that describe the velocity function. In equation (6), the superscript T denotes matrix transpose and the weight $\epsilon$ expresses the relative importance of the data versus the constraints.

Once the velocity model has been updated in the manner described, execution returns to step 406, in which map migration and ray tracing is repeated for the updated model. This process is repeated until a determination is made in step 408 that the error norm has been satisfied, indicating that a satisfactory model has been achieved and execution ceases.

It is understood that the present invention can take many forms and embodiments. The embodiments shown herein are intended to illustrate, rather than to limit the invention, it being appreciated that variations may be made without departing from the spirit or the scope of the invention. For example, a different objective function other than weighted power stack could be used in conjunction with simulated annealing, or other geologic constraints other than those mentioned above could be introduced to constrain and stabilize the solution.

Although illustrative embodiments of the invention have been shown and described, a wide range of modification, change and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method of determining a reference seismic velocity model that includes lateral and vertical variations in a stratified subterranean medium, the method comprising:

displaying a stacked section of common midpoint gathers of seismic traces, said traces representing the amplitude of seismic reflections for seismic events as a function of time and common midpoint surface location along a path of exploration of said medium;

picking normal incidence traveltimes from said display and determining the associated stacking velocities as a function of said location for selected seismic events from said stacked section;

determining true prestack traveltimes for each said selected event, by summing a term representing the best fit hyperbola for said event with a perturbation term representing the non-hyperbolic component thereof, said hyperbolic term being determined from said picked normal incidence travel times and said associated stacking velocities, and said perturbation term being determined by simulated annealing;

constructing an initial reference seismic velocity model for said medium;

determining travel times from said velocity model to be compared to said true prestack traveltimes by map migrating said picked normal incidence travel times from time to depth and then ray tracing said seismic velocity model;

comparing said travel times determined from said velocity model with said true prestack travel times, such that when they are substantially the same within a predetermined error norm, said velocity model provides an accurate representation of said subterranean medium strata;

updating said velocity model when said predetermined error norm is not satisfied, said velocity model being updated by a constrained generalized least squares solution; and returning to said step of determining travel times from said velocity model until said error norm is satisfied.

2. The method of claim 1 wherein said step of determining said perturbation term by simulated annealing comprises:

sequentially selecting and perturbing spline coefficients by a random amount until an optimum set of spline coefficients has been found, such that an energy function along said nonhyperbolic component is maximized; and accepting or rejecting the perturbed spline coefficients that deteriorate said energy function, thereby allowing the determination of the globally best solution rather than the locally best solution for said perturbation term.

3. The method of claim 2 wherein said step of accepting or rejecting the perturbed spline coefficients that deteriorate said energy function comprises:

calculating a probability function based upon the difference between the current said energy function and the maximum said energy function found;

comparing said calculated probability function with a number drawn randomly between 0 and 1; and accepting said coefficient that deteriorates said energy function when said drawn number is less than said calculated probability, and rejecting said coefficient that deteriorates said energy function when said drawn number is greater than said calculated probability.

4. The method of claim 2 wherein said energy function comprises a time-weighted power stack of said stacked section and said prestack traveltimes.

5. The method of claim 1 wherein said constrained generalized least squares solution used for updating said velocity model is defined by:

$$\delta c = [G^T G + \epsilon F^T F]^{-1} G^T (T_{obs} - T_{cal}),$$

where $\delta c$ is the amount of change in the two-dimensional matrix of said spline coefficients that describes said velocity model, $T_{OL} - T_{cal}$ is the difference between the picked and the traveltimes determined from said velocity model at the current iteration that is sought to be minimized in a least squares sense, and G is the Frechet derivative matrix $$\frac{\delta T_{cal}}{\delta c_{ij}}$$

that expresses the change in the picked traveltimes corresponding to a change in the parameters of said velocity model.

6. A method of operating a computer to determine a reference seismic velocity model that includes lateral and vertical variations in a stratified subterranean medium, the method comprising:

storing seismic data acquired for selected seismic events, said data being recorded as seismograms depicting seismic traces representing the amplitude of seismic reflections for said events as a function of time (t) and common midpoint surface location (x) along a path of exploration of said medium;

constructing a stacked section of common midpoint gathers of said seismic traces;

displaying said stacked section;

picking normal incidence traveltimes ($T_{OL}(x)$) from said display and determining the associated stacking velocities ($V_{stL}(x)$) as a function of said location (x) for selected seismic events (L) from said stacked section;

determining true prestack traveltimes ($T_L(x, h)$) for each said selected event (L) as a function of said location (x) and an offset distance (h), by summing a term representing the best fit hyperbola for said event with a perturbation term representing the non-hyperbolic component thereof, said hyperbolic term being determined from said picked normal incidence travel times and said associated stacking velocities, and said perturbation term being determined by simulated annealing;

constructing an initial reference seismic velocity model for said medium;

determining travel times ($T_{cal}(x, h)$) from said velocity model to be compared to said true prestack traveltimes ($T_L(x, h)$ by map migrating said picked normal incidence travel times from time to depth and then ray tracing said seismic velocity model;

comparing said travel times ($T_{cal}(x, h)$) determined from said velocity model with said true prestack travel times ($T_L(x, h)$), such that when they are substantially the same within a predetermined error norm, said velocity model provides an accurate representation of said subterranean medium strata;

updating said velocity model when said predetermined error norm is not satisfied, said velocity model being updated by a constrained generalized least squares solution; and returning to said step of determining travel times from said velocity model until said error norm is satisfied.

7. The method of claim 6 wherein said step of determining said perturbation term by simulated annealing comprises:

determining the number (i) of spline coefficients ($c_i$) and the range of values for said spline coefficients ($-\Delta c_i$, $+\Delta c_i$) so that said nonhyperbolic component will be bounded in a predetermined window centered along said best fit hyperbola;

setting a temperature value (p) and a maximum allowed number of cooling steps;

setting an attempted number (k) of cooling steps to number 1 (k=1);

selecting and perturbing a first said spline coefficient ($c_i$) by a random amount ($\delta c_i$) to obtain a new value ($c_i'$);

calculating a new said hyperbolic component and a new said energy function ($E(c_i')$) for said selected spline coefficient ($c_i$);

replacing said selected spline coefficient ($c_i$) with the said new value thereof ($c_i'$) when said new energy function ($E(c_i')$) is larger than the previous said energy function ($E((c_i))$) or when said new energy function ($E(c_i')$) meets an acceptance criteria; and otherwise, retaining said selected spline coefficient ($c_i$);

selecting and perturbing the next said spline coefficient ($c_i+1$) by a random amount ($\delta c_i+1$) to obtain a new value of said spline coefficient ($c_i+1$);

returning to said step of calculating said new hyperbolic component and said energy function ($E(c_i)+1$) for the new value of said spline coefficient ($C_i+1$);

advancing said number of attempted cooling steps by one (k=k+1), and if said advanced number of attempted cooling steps exceeds said total number of allowed steps (k), ending the determination;

resetting said temperature value (p) to a new temperature value (pk+1), thereby modifying said acceptance criteria; and returning to said step of selecting and perturbing said next spline coefficient.

8. The method of claim 7 wherein said acceptance criteria is determined for transitions from point i to point j in said velocity model space that deteriorate the solution with a probability:

$$G(\Delta E_{ij}) = \exp\left(\frac{-(E(j) - E_{min})}{p_k}\right)$$

where $p_k = f(E_{max} - E_{min})$ and $E_{min}$ and $E_{max}$ are the minimum and maximum values, respectively, of said energy function encountered so far since the beginning of said simulated annealing cooling process.

9. The method of claim 6 wherein said perturbation term is determined by expanding the change in said true prestack traveltimes ($\Delta T_L(x, h)$) in the interval ($h_{min}, h_{max}$), where $h_{min}$ is defined as the minimum offset distance between said seismic source and any of said locations (x) and $h_{max}$ is defined as the maximum such distance, in terms of cubic B-spline basis functions $F_i(h)$:

$$\Delta T_L(x,h) = \sum_{i=1}^{M+3} c_{iL}(x) F_i(h),$$

where M+3 corresponds to the total number of basis functions used and $c_{iL}(x)$ are the spline coefficients, and recovery of said nonhyperbolic component in said true prestack traveltimes ($\Delta T_L(x, h)$) involves estimating the values of the spline coefficients $c_{iL}(x)$, for i=1 to M+3.

10. A computer program stored on a computer-readable medium for execution by a computer for determining a reference seismic velocity model that includes lateral and vertical variations in a stratified subterranean medium, the computer program comprising:

instructions for storing seismic data acquired for selected seismic events, said data being recorded as seismograms depicting seismic traces representing the amplitude of seismic reflections for said events as a function of time (t) and common midpoint surface location (x) along a path of exploration of said medium;

instructions for constructing a stacked section of common midpoint gathers of said seismic traces;

instructions for displaying said stacked section;

instructions for picking normal incidence traveltimes ($T_{OL}(x)$) from said display and determining the associated stacking velocities ($V_{stL}(x)$) as a function of said location (x) for selected seismic events (L) from said stacked section;

instructions for determining true prestack traveltimes ($T_L(x, h)$) for each said selected event (L) as a function of said location (x) and an offset distance (h), by summing a term representing the best fit hyperbola for said event with a perturbation term representing the non-hyperbolic component thereof, said hyperbolic term being determined from said picked normal incidence travel times and said associated stacking velocities, and said perturbation term being determined by simulated annealing;

instructions for constructing an initial reference seismic velocity model for said medium;

instructions for determining travel times ($T_{cal}(x, h)$) from said velocity model to be compared to said true prestack traveltimes ($T_L(x, h)$ by map migrating said picked normal incidence travel times from time to depth and then ray tracing said seismic velocity model;

instructions for comparing said travel times ($T_{cal}(x, h)$) determined from said velocity model with said true prestack travel times ($T_L(x, h)$), such that when they are substantially the same within a predetermined error norm, said velocity model provides an accurate representation of said subterranean medium strata;

instructions for updating said velocity model when said predetermined error norm is not satisfied, said velocity model being updated by a constrained generalized least squares solution; and instructions for returning to said instructions for determining travel times from said velocity model until said error norm is satisfied.

11. The computer program of claim 10 wherein said instructions for determining said perturbation term by simulated annealing comprise:

instructions for determining the number (i) of spline coefficients ($c_i$) and the range of values for said spline coefficients ($-\Delta c_i$, $+\Delta c_i$) so that said nonhyperbolic component will be bounded in a predetermined window centered along said best fit hyperbola;

instructions for setting a temperature value (p) and a maximum allowed number of cooling steps;

instructions for setting an attempted number (k) of cooling steps to number 1 (k=1);

instructions for selecting and perturbing a first said spline coefficient ($c_i$) by a random amount ($\delta c_i$) to obtain a new value ($c_i'$);

instructions for calculating a new said hyperbolic component and a new said energy function ($E(c_i')$) for said selected spline coefficient ($c_i$);

instructions for replacing said selected spline coefficient ($c_i$) with the said new value thereof ($c_i$) when said new energy function ($E(c_i')$) is larger than the previous said energy function ($E((c_i)$) or when said new energy function ($E(c_i')$) meets an acceptance criteria; and otherwise, retaining said selected spline coefficient ($c_i$);

instructions for selecting and perturbing the next said spline coefficient ($c_i+1$) by a random amount ($\delta c_i+1$) to obtain a new value of said spline coefficient ($c_i+1$);

instructions for returning to said step of calculating said new hyperbolic component and said energy function ($E(c_i)+1$) for the new value of said spline coefficient ($C_i+1$);

instructions for advancing said number of attempted cooling steps by one (k=k+1), and if said advanced number of attempted cooling steps exceeds said total number of allowed steps (k), ending the determination;

instructions for resetting said temperature value (p) to a new temperature value (pk+1), thereby modifying said acceptance criteria; and instructions for returning to said step of selecting and perturbing said next spline coefficient.

12. The computer program of claim 11 wherein said acceptance criteria is determined for transitions from point i to point j in said velocity model space that deteriorate the solution with a probability:

$$G(\Delta E_{ij}) = \exp\left(\frac{-(E(j) - E_{min})}{p_k}\right)$$

where $p_k = f(E_{max} - E_{min})$ and $E_{min}$ and $E_{max}$ are the minimum and maximum values, respectively, of said energy function encountered so far since the beginning of said simulated annealing cooling process.

13. The method of claim 10 wherein said perturbation term is determined by expanding the change in said true prestack traveltimes ($\Delta T_L(x, h)$) in the interval ($h_{min}, h_{max}$), where $h_{min}$ is defined as the minimum offset distance between said seismic source and any of said locations (x) and $h_{max}$ is defined as the maximum such distance, in terms of cubic B-spline basis functions $F_i(h)$:

$$\Delta T_L(x,h) = \sum_{i=1}^{M+3} c_{iL}(x) F_i(h),$$

where M+3 corresponds to the total number of basis functions used and $c_{iL}(x)$ are the spline coefficients, and recovery of said nonhyperbolic component in said true prestack traveltimes ($\Delta T_L(x, h)$) involves estimating the values of the spline coefficients $c_{iL}(x)$, for i=1 to M+3.

* * * * *